Patented Sept. 17, 1935

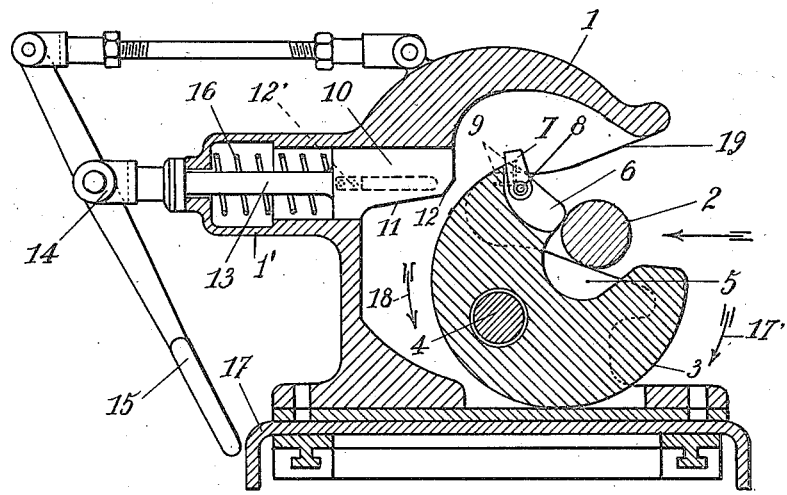
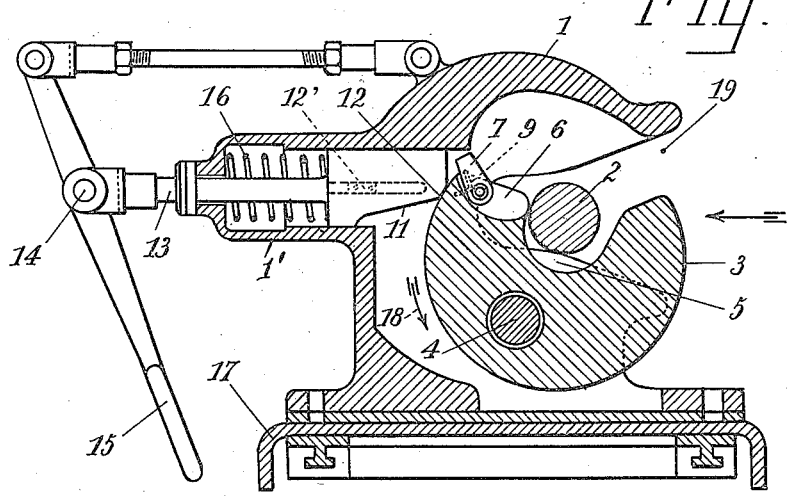

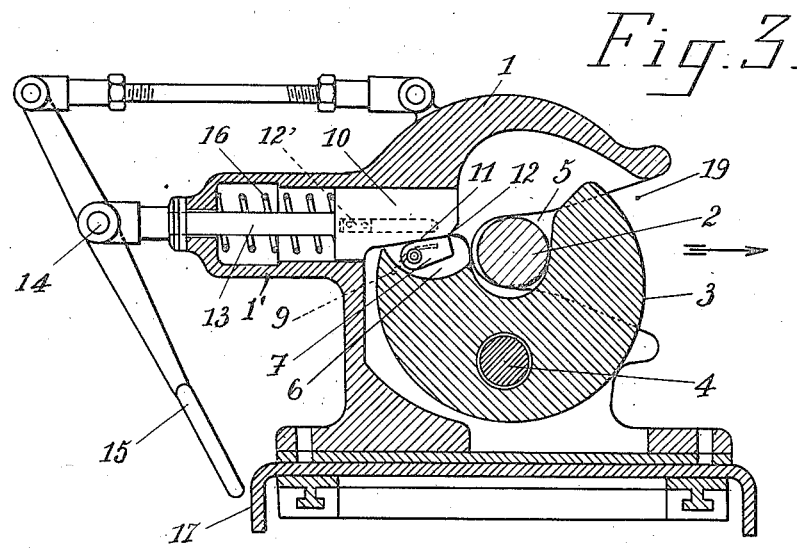
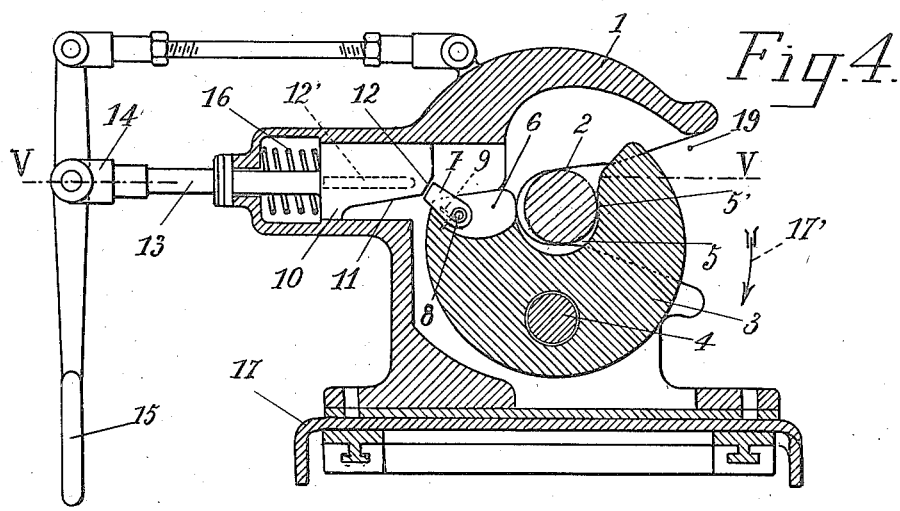
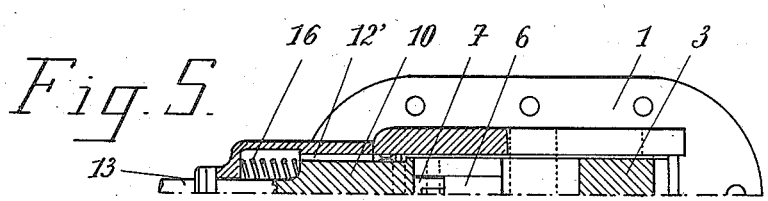

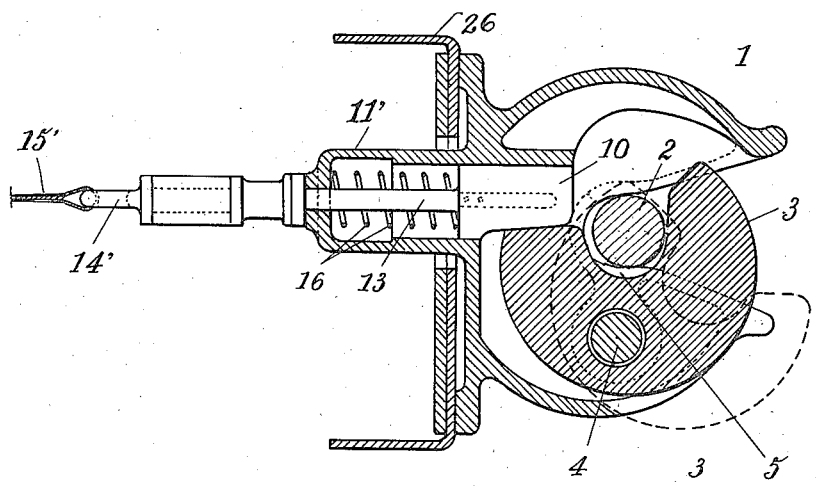
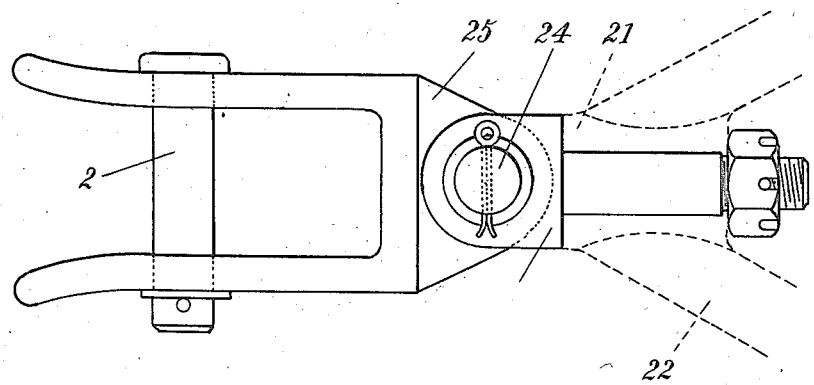
JOSEPH CODER
INVENTOR

2,014,963

UNITED STATES PATENT OFFICE 2,014,963

AUTOMATIC COUPLING DEVICE FOR VEHICLES

Joseph Coder, Marseille, France

Application August 8, 1933, Serial No. 684,196
In France March 10, 1933

14 Claims. (Cl. 280—33.15)

This invention relates to couplings for vehicles whereby a towed vehicle may be readily coupled to or released from a towing vehicle.

In all cases concerning the automatic coupling of a towed vehicle to a tractor, numerous conditions are involved which have to be fulfilled, of which the principal requirement is security of the coupling making the connection, then follow the strength of the means employed, ease of operation and finally the efficiency of the device.

Consideration of all these conditions has led the specialists to design very ingenious ideas relating to connecting devices, which often appear to be too complex and delicate for the practical applications which have to be satisfied according to the problem set, which is to obtain maximum security with the minimum number of moving parts and ease of operation.

This problem is solved by the embodiment of the present invention which consists of an automatic connecting device operating by simple coupling. The main object of my invention is to produce by means of mechanical members which are very simple, extremely substantial and few in number, the automatic coupling of a towing vehicle to a towed vehicle.

This device is primarily characterized by the coupling member which consists of a disc which is partly cut; this disc rotates eccentrically on a strong support which is attached solidly to the fixed portion of the device, and, this latter being mounted on a movable, round, base similar to that of a swiveling truck, which allows free movement of both the tractor and the towed vehicle round curves.

This device is shown in the attached diagrammatic drawings, which are given as a typical example but which can also serve as an example of the application of one of the forms of the embodiment of the invention.

In these drawings:

Figure 1 shows the coupling device in the opening position.

Figure 2 shows the device in an intermediate position.

Figure 3 shows the device in the position for closing while connecting two vehicles.

Figure 4 shows the position for release allowing the device to open for the separation of the two vehicles.

Figure 5 shows a section in part plan through line V—V in Figure 4 of the device according to the invention.

Figure 6 shows in longitudinal section a modified form of the coupling device in its closed position, its open position being indicated by dotted lines.

Figure 7 shows in plan view the end of the connecting member on the towed vehicle.

The coupling device primarily includes two main parts, of which part 1 is attached to the tractor, while the other, a shaft or the like 2 forms part of the towed vehicle.

Part 1 forms a casing or frame in the interior of which is movably mounted a coupling member 3 which couples the two vehicles and consists of a disc 3 which rotates eccentrically but freely on a strong shaft 4 which is fixed very solidly in the casing or frame 1. The disc 3 has a large hollow portion 5 into which the shaft 2 may enter, being attached solidly to the towed vehicle, while a smaller notch 6 takes a pawl 7 turning about a pivot 8. This pawl is subjected to the action of a spring 9 the main purpose of which is to keep, by its tension, the pawl 7 in a raised position as shown on Figures 1 and 4. A sliding bolt 10 is placed in the hollow cylinder 1' of frame 1 in the axial and longitudinal plane of the disc 3 and at one end has a flat surface 11 and an inclined surface 12, while at the other end it extends to a rod 13 terminating at a connector 14 of conventional form joining the bolt to an operating control member consisting of a lever 15. A compression spring 16 is placed on this bolt so that its tension tends continually to urge the bolt to the interior of the casing 1.

Obviously the bolt, or as it may also be termed, the slidable locking member 10, although round, is nevertheless not rotatable, due to its connections with the lever 15 by means of connector 14.

The casing 1 is fitted to a movable support or round base 17, fitted solidly to the tractor body and resting upon a support means (not shown) upon which it may swivel, thus allowing the towed vehicle to follow all the curves or bends of the road.

The shaft or part 2 is attached solidly to the towed vehicle by known means which are consequently not shown in the attached drawings, and hence, this shaft could be held at each end in a frame forming a bearing fixed, for example, to the chassis of the towed vehicle. Likewise, the shaft 2 could be provided with running gear such as rollers to facilitate its re-entry into frame or casing 1. Also, depending on the weight of the load to be towed, the number of the frames 1 can be increased so that the tractive effect and strain can be distributed among several discs similar to disc 3. These frames 1 will be all mounted solidly on the same movable round support 17.

Thus constituted the automatic coupling for vehicles operates in the following manner:—

When connecting the vehicles, the bolt 10 which is provided, as shown in Figure 1, with a guide 12' and is moved backwards by the control lever 15 into the position shown in Figure 4, and the disc 3, no longer being held back, and also since it is unbalanced, falls in the direction of the arrow 17', thus automatically disposing the hollow portion 5 opposite the opening 19 of frame 1. Either by the recoil of the tractor or by the forward movement of the towed vehicle, the shaft 2 engages in frame 1 and enters the hollow portion 5, while continuation of the movement of approach of the two vehicles towards one another causes the disc 3 to rotate in the direction of the arrow 18 as in intermediate position shown in Figure 2. This movement also causes the pawl 7 to be lowered. As soon as the lower edge of bolt 10 ceases to make contact with the periphery of the disc 3, this bolt is forced forward by the expansion of the spring 16 and by obstruction on the part of its surface 11, locks the disc 3 as shown in Figure 3, which disc by its rotation has thus caused the two vehicles to become coupled, bringing about, as desired, by the horizontal movement of shaft 2, the intended connection by transferring to the tractor a part of the load by raising the front part of the towed vehicle.

The whole of the tractive effect or strain is borne efficiently by all the surfaces in contact and can in no case cause uncoupling of the vehicles involved.

As already stated, according to the load to be towed, the number of frames 1 can be increased, their form being such that several can be mounted on the same round support 17 and coupling or connection is thus secured by disposing each of the parts as shown in Figure 3.

When it is desired to disconnect or uncouple the vehicle, as in Fig. 4, it is sufficient to operate the control lever 15 in order to draw back the bolt 10, for the backward movement of this bolt then allows the pawl 7 to be automatically raised again due to the pressure of the spring 9. This pawl having reached the limit of its movement is exactly opposite the inclined surface 12 and makes obstructive contact with this surface and thus forms a stop which prevents the bolt 10 from returning to its original position.

It is necessary, in order to fully understand the uncoupling operation, to mention that the surface of the stop is inclined in a perfectly determined manner, so that it can never obstruct or prevent the movement of the disc 3 which takes place, during uncoupling or disconnection. During the uncoupling operation, either due to the forward motion of the tractor or by the recoil of the towed vehicle, the shaft 2, as seen in Figure 4, rests on the side 5' of the hollow portion 5 and causes the disc 3 to rotate clockwise in the direction of the arrow 17' up to the moment when shaft 2 comes opposite the opening 19 of frame 1, and thereafter the sliding bolt 10 again rests on the periphery of the disc 3 or the shoulder of the rod 13 and the coupling device is thus returned automatically in the position for connection shown in Figure 1.

In the modification illustrated in Figure 6, the frame 1 is fixed to a cross-piece 26 placed at the back of the tractor, while the pawl 7 is omitted and the sliding bolt 10 is operated from a distance directly by a pulling member 15' attached to a link 14' drawing along the rod 13 which is moved in the cylinder 11' and compresses the spring 16. The mentioned pulling member 15 terminates at a control lever (not shown) near the driver.

This distant control is provided especially for disconnecting the towed vehicle so that in the event of it catching fire when loaded with inflammable material it is immediately abandoned without it being necessary for the attendant to approach very near to the point of danger in order to operate the disconnecting gear, as in the cases where the arrangement operated by the lever 15 is retained. Nevertheless, this uncoupling can be made under the same conditions if the pulling member 15' is attached to the lever 15.

In the two methods, either with the lever 15 or with the pulling member 15', the connecting member shown in Figure 7 remains the same and preferably consists of a bracket 21 which connects the ends of the towing triangle 22, so that the cylindrical rod of the head 23 turns freely in this bracket and the head 23 holds, by means of the pin 24, the coupling head 25 which carries the draw-pin 2 which enters the opening 5 of the disc 3.

This coupling device for a towed vehicle can be mounted according to requirements on a movable round base or on a fixed cross-piece. The modifications in design and dimensions do not alter the general arrangement of the invention described, so that several coupling units can be mounted on the same movable round base or cross-piece.

What I claim and desire to secure by Letters Patent of the United States is:—

1. An automatic coupling device for coupling two vehicles, including in combination, a coupling member secured to one of said vehicles and having one portion thereof extending toward the other vehicle, a frame carried by said other vehicle and having a shaft secured thereon, a swingable coupling disc eccentrically mounted upon said shaft and having a hollow portion adapted to receive and envelope the extending portion of said coupling member upon said one vehicle when in closed position, a non-rotary slidable locking member mounted in said frame serving both to lock said swingable coupling disc in closed position and to allow release of the same, which slidable locking member has one side thereof formed with an inclined portion reducing the cross section of said slidable locking member toward one end thereof and substantially making the same a slidable wedge adapted to have the inclined portion thereof engage against and obstruct a portion upon the extremity of one of the jaws of said coupling disc in the closed position of the latter, and means for withdrawing said slidable locking member from locking position.

2. An automatic coupling device for coupling two vehicles, including in combination, a coupling member secured to one of said vehicles and having one portion thereof extending toward the other vehicle, a frame carried by said other vehicle and having a shaft secured thereon, a swingable coupling disc eccentrically mounted upon said shaft and having a hollow portion adapted to receive and envelope the extending portion of said coupling member upon said one vehicle when in closed position, a non-rotary slidable locking member mounted in said frame serving both to lock said swingable coupling disc in closed position and to allow release of the same, which slidable locking member has a locking surface formed adjacent to one end thereof capable of engaging against and obstructing a locking portion upon the extremity of one of the jaws of said coupling disc in the closed position of the latter, and means for withdrawing said slidable locking member from locking position.

3. An automatic coupling device for coupling two vehicles, including in combination, a coupling member secured to one of said vehicles and having one portion thereof extending toward the other vehicle, a hollow frame forming a casing carried by said other vehicle and having a shaft passing through the hollow portion thereof, a swingable coupling disc mounted upon said shaft in said casing and having a hollow portion adapted to receive and envelope the extending portion of said coupling member upon said one vehicle when in closed position, a non-rotary slidable locking member mounted in said frame serving both to lock said swingable coupling disc in closed position and to allow release of the same, which slidable locking member has a locking surface formed adjacent to one end thereof capable of engaging against and obstructing a locking portion upon the extremity of one of the jaws of said coupling disc in the closed position of the latter, means tending to cause said slidable locking member to move longitudinally and lock said swingable disc when the latter is in closed position, and means for withdrawing said slidable locking member from locking position.

4. A coupling device according to claim 2, wherein the locking portion of the swingable coupling disc adapted to be engaged by the slidable locking member is effective to lock said coupling disc solely in closed position and wherein the coupling disc is provided with a swingable pawl adjacent to the locking portion of said disc, which pawl in one extreme position lies idle within the outline of said locking portion so as to be retained in idle position when the slidable locking member engages said locking portion, while in another raised position said pawl abuts a portion of the end of said slidable locking member and prevents the same from engaging with said locking portion and retains the slidable locking member at a sufficient distance for the periphery of the coupling disc to clear the end of said slidable locking member while swinging into open position.

5. A coupling device according to claim 3, wherein the locking portion of the swingable coupling disc adapted to be engaged by the slidable locking member is effective to lock said coupling disc solely in closed position and wherein the coupling disc is provided with a swingable pawl adjacent to the locking portion of said disc, which pawl in one extreme position lies idle within the outline of said locking portion so as to be retained in idle position when the slidable locking member engages said locking portion, while in another raised position said pawl abuts a portion of the end of said slidable locking member and prevents the same from engaging with said locking portion and retains the slidable locking member at a sufficient distance for the periphery of the coupling disc to clear the end of said slidable locking member while swinging into open position.

6. A coupling device according to claim 2, wherein the means tending to cause the slidable locking member to move and lock the swingable disc in the closed position comprises a spring urging said slidable locking member against said swingable disc, and the locking surface of the slidable locking member constitutes an inclined portion making said member substantially a slidable wedge engaging with its inclined portion against the locking portion of the swingable disc to lock the same in said closed position thereof.

7. A coupling device according to claim 3, wherein the means tending to cause the slidable locking member to move and lock the swingable disc in the closed position comprises a spring urging said slidable locking member against said swingable disc, and the locking surface of the slidable locking member constitutes an inclined portion making said member substantially a slidable wedge engaging with its inclined portion against the locking portion of the swingable disc to lock the same in said closed position thereof.

8. A coupling device according to claim 2, wherein the means tending to cause the slidable locking member to move and lock the swingable disc in the closed position comprises a spring urging said slidable locking member against said swingable disc, and the means for withdrawing the slidable locking member from locking position comprises a rod projecting from the frame and connected to a manually operated lever mounted upon said frame.

9. A coupling device according to claim 3, wherein the means tending to cause the slidable locking member to move and lock the swingable disc in the closed position comprises a spring urging said slidable locking member against said swingable disc, and the slidable locking member has a rod projecting from the casing and is connected to means for pulling said rod and thereby withdrawing the slidable locking member from locking position.

10. A coupling device according to claim 2, wherein the locking surface of the slidable locking member constitutes an inclined portion making said slidable member substantially into a slidable wedge engaging with its inclined portion against the locking portion of the swingable disc so as to effectively lock the same solely in closed position and wherein a swingable pawl is provided upon said swingable coupling disc adjacent to the locking portion of said swingable disc, which pawl in one extreme position lies idle within the outline of said locking portion so as to be retained in idle position when the slidable locking member engages said locking portion of the disc, while in another raised position said pawl abuts a portion of the end of said slidable locking member and stops the same from engaging with said locking portion of the disc and retains said locking member at a sufficient distance for the periphery of the swingable disc to clear the end of said locking member while swinging into open position.

11. A coupling device according to claim 3, wherein the locking surface of the slidable locking member constitutes an inclined portion making said slidable member substantially into a slidable wedge obstructing by its inclined portion the locking portion of the swingable disc so as to effectively lock the same solely in closed position and wherein a swingable pawl is provided upon said swingable coupling disc adjacent to the locking portion of said swingable disc, which pawl in one extreme position lies idle within the outline of said locking portion so as to be retained in idle position when the slidable locking member engages said locking portion of the disc, while in another raised position said pawl abuts a portion of the end of said slidable locking member and stops the same from engaging with said locking portion of the disc and retains said locking member at a sufficient distance for the periphery of the swingable disc to clear the end of said locking member while swinging into open position.

12. A coupling device according to claim 2, wherein the frame is rigidly attached to its respective vehicle by means of a movable round base so that it may swivel with said base together with its associated swingable coupling disc, shaft and slidable locking member when the vehicles pass around a curve.

13. A coupling device according to claim 3, wherein the frame is rigidly attached to its respective vehicle by means of a movable round base so that it may swivel with said base together with its associated swingable coupling disc, shaft and slidable locking member when the vehicles pass around a curve.

14. A coupling device according to claim 3, wherein a plurality of similar frames having a corresponding plurality of similar swingable coupling discs, slidable locking members and shafts, are secured upon a movable base attached to the vehicle involved, so that said frames may swivel with said base when the vehicles pass around a curve.

JOSEPH CODER.